(12) United States Patent
Ohmori

(10) Patent No.: US 11,101,483 B2
(45) Date of Patent: *Aug. 24, 2021

(54) ELECTROCHEMICAL CELL STACK

(71) Applicant: NGK INSULATORS, LTD., Nagoya (JP)

(72) Inventor: Makoto Ohmori, Nagoya (JP)

(73) Assignee: NGK INSULATORS, LTD., Nagoya (JP)

(*) Notice: Subject to any disclaimer, the term of this patent is extended or adjusted under 35 U.S.C. 154(b) by 28 days.

This patent is subject to a terminal disclaimer.

(21) Appl. No.: 16/176,623

(22) Filed: Oct. 31, 2018

(65) Prior Publication Data
US 2019/0067724 A1 Feb. 28, 2019

Related U.S. Application Data

(63) Continuation of application No. PCT/JP2018/026372, filed on Jul. 12, 2018.

(30) Foreign Application Priority Data

Jul. 26, 2017 (JP) .............................. JP2017-144861

(51) Int. Cl.
H01M 8/00 (2016.01)
H01M 8/1253 (2016.01)
(Continued)

(52) U.S. Cl.
CPC ........ *H01M 8/1253* (2013.01); *C01G 25/006* (2013.01); *C01G 25/02* (2013.01);
(Continued)

(58) Field of Classification Search
None
See application file for complete search history.

(56) References Cited

U.S. PATENT DOCUMENTS

2013/0252127 A1  9/2013  Tsunoda et al.
2016/0285122 A1  9/2016  El Batawi et al.
(Continued)

FOREIGN PATENT DOCUMENTS

JP  2008-251236 A  10/2008
JP  2012-054015 A   3/2012
(Continued)

OTHER PUBLICATIONS

Japanese language International Search Report and Written Opinion from corresponding PCT/JP2018/026372 (9 pgs).
(Continued)

*Primary Examiner* — Milton I Cano
*Assistant Examiner* — Mary G Henshaw
(74) *Attorney, Agent, or Firm* — Flynn Thiel, P.C.

(57) ABSTRACT

The electrochemical cell stack includes an electrochemical cell disposed between a first separator and a second separator. The electrochemical cell includes an anode, a cathode, and a solid electrolyte layer disposed between the anode and the cathode. The solid electrolyte layer, containing a zirconia-based material as a main component, has a downstream part and an upstream part. The downstream part is positioned on a downstream side in a flow direction of a fuel gas in a fuel flow passage between the anode and the first separator. The upstream part is positioned on an upstream side in the flow direction. The downstream part includes a first region within 3 μm from an anode side surface, and a second region between the first region and the cathode. An
(Continued)

intensity ratio of tetragonal zirconia to cubic zirconia in a Raman spectrum of the first region is greater than that of the second region.

3 Claims, 4 Drawing Sheets

(51) Int. Cl.
*H01M 8/2425* (2016.01)
*H01M 8/1213* (2016.01)
*H01M 8/0258* (2016.01)
*H01M 8/126* (2016.01)
*C01G 25/02* (2006.01)
*C01G 25/00* (2006.01)
*H01M 8/12* (2016.01)
*H01M 8/124* (2016.01)

(52) U.S. Cl.
CPC .......... *H01M 8/0258* (2013.01); *H01M 8/12* (2013.01); *H01M 8/126* (2013.01); *H01M 8/1213* (2013.01); *H01M 8/2425* (2013.01); *C01P 2002/82* (2013.01); *H01M 2008/1293* (2013.01); *H01M 2300/0077* (2013.01); *Y02E 60/50* (2013.01)

(56) References Cited

U.S. PATENT DOCUMENTS

| | | |
|---|---|---|
| 2017/0062856 A1 | 3/2017 | Ohmori et al. |
| 2017/0062857 A1 | 3/2017 | Ohmori et al. |

FOREIGN PATENT DOCUMENTS

| | | |
|---|---|---|
| JP | 2012-182029 A | 9/2012 |
| JP | 2014-110088 A | 6/2014 |
| JP | 2014-191944 A | 10/2014 |
| JP | 2015-115181 A | 6/2015 |
| JP | 2016-184468 A | 10/2016 |
| JP | 2017-022106 A | 1/2017 |
| WO | WO 2015/182527 A1 | 12/2015 |

OTHER PUBLICATIONS

English International Search Report from corresponding PCT/JP2018/026372 (2 pages).

U.S. Appl. No. 16/225 283, filed Dec. 19, 2018.

English language Notification of Transmittal of Translation of the International Preliminary Report on Patentability, dated Feb. 6, 2020, and Written Opinion for corresponding PCT/JP2018/026372, dated Aug. 7, 2018 (7 pages).

ELECTROCHEMICAL CELL STACK

CROSS-REFERENCE TO RELATED APPLICATIONS

This application is a continuation application of PCT/JP2018/026372, filed Jul. 12, 2018, which claims priority to Japanese Application No. 2017-144861, filed Jul. 26, 2017, the entire contents all of which are incorporated herein by reference.

TECHNICAL FIELD

The present invention relates to an electrochemical cell stack.

BACKGROUND ART

A fuel cell stack that has a so-called flat plate stack structure in which a plurality of fuel cells and a plurality of separators are alternatively stacked is known as a conventional type of electrochemical cell stack (for example, reference is made to Japanese Patent Application Laid-Open No. 2015-115181).

Each fuel cell includes an anode, a cathode and a solid electrolyte layer disposed between the anode and the cathode.

A space between an anode and a separator that is disposed on one side of a fuel cell forms a fuel flow passage. When operating the fuel cell, a fuel gas (for example, hydrogen) flows in the fuel flow passage.

SUMMARY OF INVENTION

When the electrochemical cell stack disclosed in Patent Literature 1 is stopped under emergency conditions, it may be the case that the air from the outlet for the fuel gas flows back into the fuel flow passage. In this case, the region on the downstream side of the anode is re-oxidized by the air that has undergone a reverse flow, and thereby the solid electrolyte layer may be damaged by the stress imparted onto the solid electrolyte layer.

The present invention is proposed based on the new insight above, and has the object of providing an electrochemical cell stack that enables the inhibition of damage to a solid electrolyte layer.

The electrochemical cell stack according to the present invention includes a first separator, a second separator, and an electrochemical cell disposed between the first separator and the second separator. The electrochemical cell includes an anode, a cathode and a solid electrolyte layer. The solid electrolyte layer is disposed between the anode and the cathode and contains a zirconia-based material as a main component. The solid electrolyte layer has a downstream part and an upstream part. The downstream part is positioned on a downstream side in a flow direction of the fuel gas which flows in a fuel flow passage between the anode and the first separator. The upstream part is positioned on an upstream side in the flow direction. The downstream part includes a first region within 3 μm from an anode side surface, and a second region disposed between the first region and the cathode. An intensity ratio of tetragonal zirconia to cubic zirconia in a Raman spectrum of the first region is greater than an intensity ratio of tetragonal zirconia to cubic zirconia in a Raman spectrum of the second region.

The present invention provides an electrochemical cell stack that inhibits damage to a solid electrolyte layer.

DESCRIPTION OF EMBODIMENTS

Fuel Cell Stack 10

Figure 1:
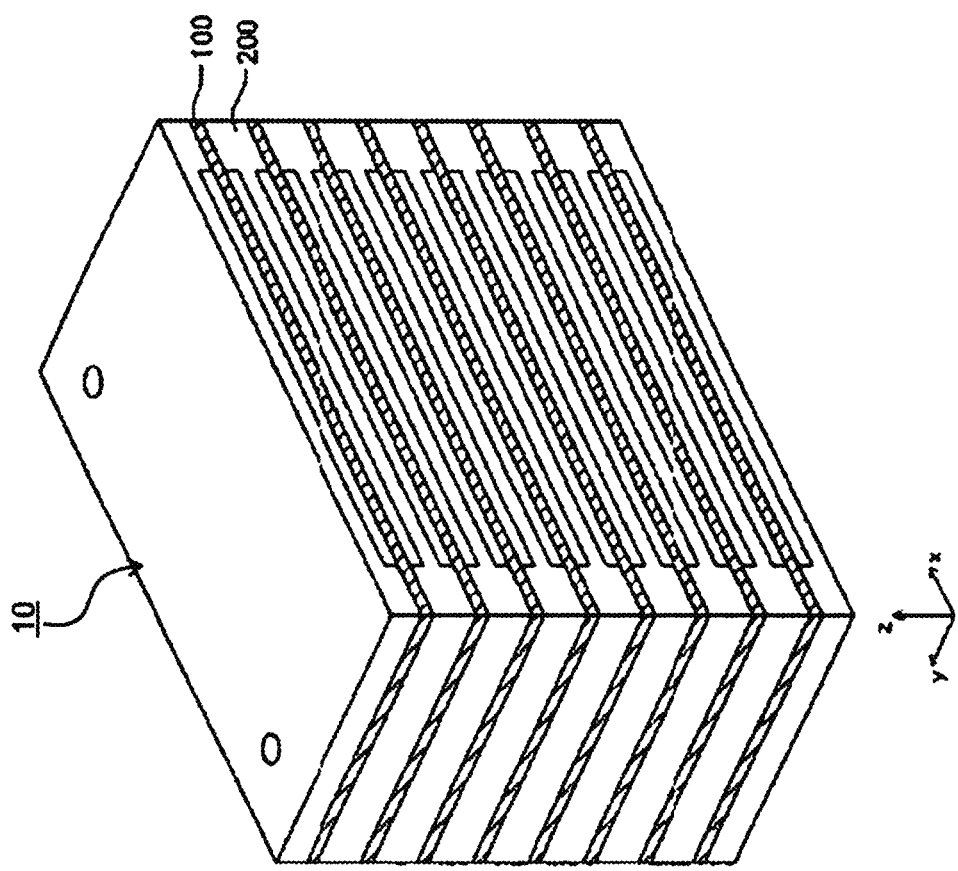
FIG. 1 is a perspective view of a fuel cell stack.
Figure 2:
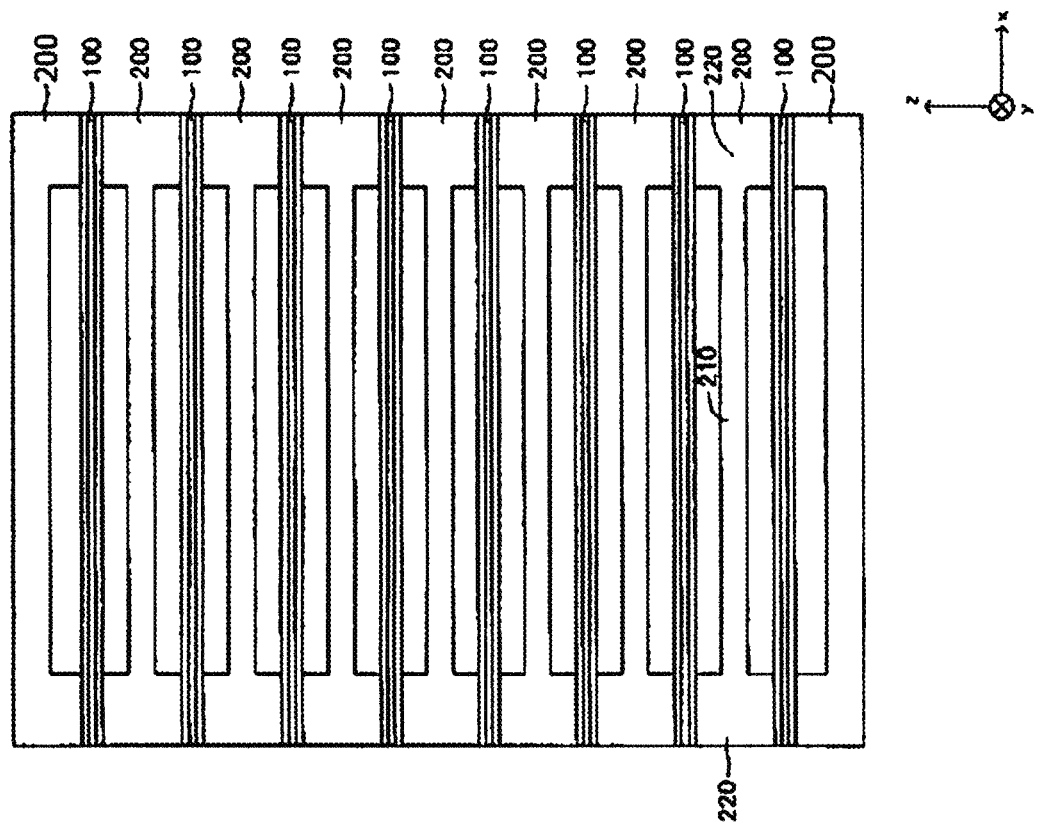
FIG. 2 is a sectional view of a fuel cell stack.
Figure 3:
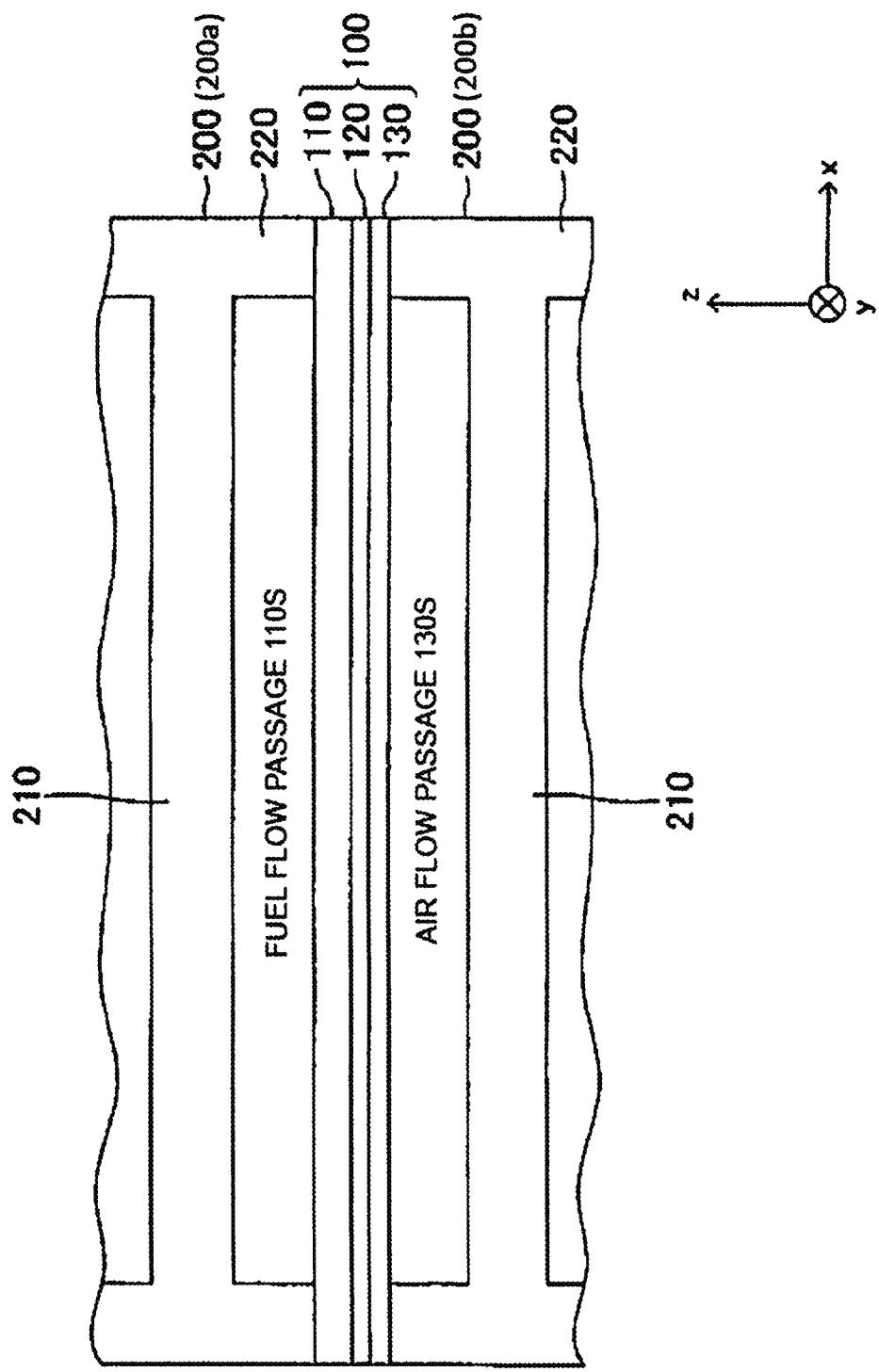
FIG. 3 is an enlarged view of FIG. 2.

FIG. 1 is a perspective view of a fuel cell stack. FIG. 2 is a sectional view of a fuel cell stack. FIG. 3 is an enlarged view of FIG. 2.

The fuel cell stack 10 has a so-called "flat plate stack structure" in which a plurality of fuel cells (referred to below as "cells") 100 and a plurality of separators 200 are alternatively stacked.

1. Cells 100

As shown in FIG. 3, the cells 100 include an anode 110, a solid electrolyte layer 120 and a cathode 130. Although there is no limitation on the planar shape of the cells 100, the length of one edge for example may form a square of 10 to 300 mm. Although there is no limitation on the thickness of the cells 100, for example, it may be configured as 110 to 2100 μm.

The anode 110 is configured with a substance that exhibits oxide ion conductivity and a substance that exhibits an electrode conductivity. For example, the anode 110 may be configured by NiO-8YSZ (8 mol % of yttria-stabilized zirconia), or NiO-GDC (gadolinium-doped ceria), or the like. Although there is no limitation on the thickness of the anode 110, for example, it may be configured as 50 to 2000 μm. Although there is no limitation on the porosity of the anode 110, for example, it may be configured as 15 to 55%.

The solid electrolyte layer 120 is disposed between the anode 110 and the cathode 130. The solid electrolyte layer 120 functions as a sealing layer to prevent the mixture of fuel gas (for example, hydrogen gas) and oxygen-containing gas (for example, air). The solid electrolyte layer 120 contains a zirconia-based material as a main component. The inclusion of a main component of a zirconia-based material means that the zirconia-based material is greater than or equal to 70 wt %. The zirconia-based material may include use, for example, 3YSZ (3 mol % yttria-stabilized zirconia), 8YSZ, 10YSZ, ScSZ (zirconia stabilized with scandia), or the like. The detailed structure of the solid electrolyte layer 120 will be described below.

Although there is no particular limitation on the thickness of the solid electrolyte layer 120, for example, it may be configured as 3 to 50 μm. Although there is no limitation on the porosity of the solid electrolyte layer 120, for example, it may be configured as 0 to 10%.

The cathode 130, for example, is configured by (LaSr)(CoFe)O$_3$) (LSCF, lanthanum strontium cobalt ferrite), (La, Sr) FeO$_3$ (LSF, lanthanum strontium ferrite), La(Ni, Fe)O$_3$ (LNF, lanthanum nickel ferrite), (La, Sr)CoO$_3$) (LSC, lanthanum strontium cobaltite), or the like. Although there is no particular limitation on the thickness of the cathode 130, for example, it may be configured as 50 to 2000 μm. Although there is no limitation on the porosity of the cathode 130, for example, it may be configured as 15 to 55%.

2. Separator 200

The separator 200 may be configured with an Ni-based heat-resistant alloy (for example, a ferrite-based SUS, Inconel 600 and Hastelloy). The planar shape of the separator 200 is the same as the planar shape of the cell 100.

As shown in FIG. 2 and FIG. 3, the separator 200 includes a flat plate portion 210 and a frame body 220. The peripheral edge portion of the flat plate portion 210 is enclosed by the frame body 220 along the entire periphery. The thickness of the frame body 220 is greater than the thickness of the flat plate portion 210. The frame body 220 protrudes on both sides of the flat plate portion 210.

As shown in FIG. 3, the cell 100 is disposed between the first separator 200a and the second separator 200b. The cell 100 is retained between the first separator 200a and the second separator 200b. The cell 100 is in connection with the respective frame bodies 220 of the first separator 200a and the second separator 200b. The peripheral edge portion of the cell 100 may be connected with each frame body 220 through a bonding material (for example, a glass material, or the like).

The space between the first separator 200a and the anode 110 of the cell 100 forms a fuel flow passage 1105 in which a fuel gas flows. The space between the second separator 200b and the cathode 130 of the cell 100 forms an air flow passage 130S in which air flows.

Power generation is performed based on the chemical reaction equations (1) and (2) below as a result of the flow of a fuel gas in the fuel flow passage 1105, together with the flow of air in the air flow passage 130S and electrical connection of the cell 100 with a load of an external portion.

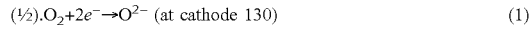

$$(\tfrac{1}{2}).O_2 + 2e^- \rightarrow O^{2-} \text{ (at cathode 130)} \quad (1)$$

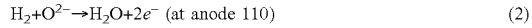

$$H_2 + O^{2-} \rightarrow H_2O + 2e^- \text{ (at anode 110)} \quad (2)$$

Configuration of Solid Electrolyte Layer 120

Next, the configuration of the solid electrolyte layer 120 of each cell 100 will be described.

The solid electrolyte layer 120 includes a downstream part 120a and an upstream part 120b.

The downstream part 120a is integrally formed with the upstream part 120b. The downstream part 120a is positioned on a downstream side of the upstream part 120b with reference to the flow direction FG of the fuel gas. That is to say, the downstream part 120a is in a region in proximity to the flow outlet (not shown) for the fuel gas in the solid electrolyte layer 120. More specifically, the downstream part 120a can be set with reference to a ¼ region (L/4) of the total length L of the solid electrolyte layer 120 in the flow direction FG.

The upstream part 120b is positioned on an upstream side of the downstream part 120a with reference to the flow direction FG of the fuel gas. That is to say, the upstream part 120b is in a region in proximity to the flow inlet (not shown) for the fuel gas in the solid electrolyte layer 120. More specifically, the upstream part 120b can be set with reference to a ¾ region (3L/4) of the total length L of the solid electrolyte layer 120 in the flow direction FG.

Figure 4:
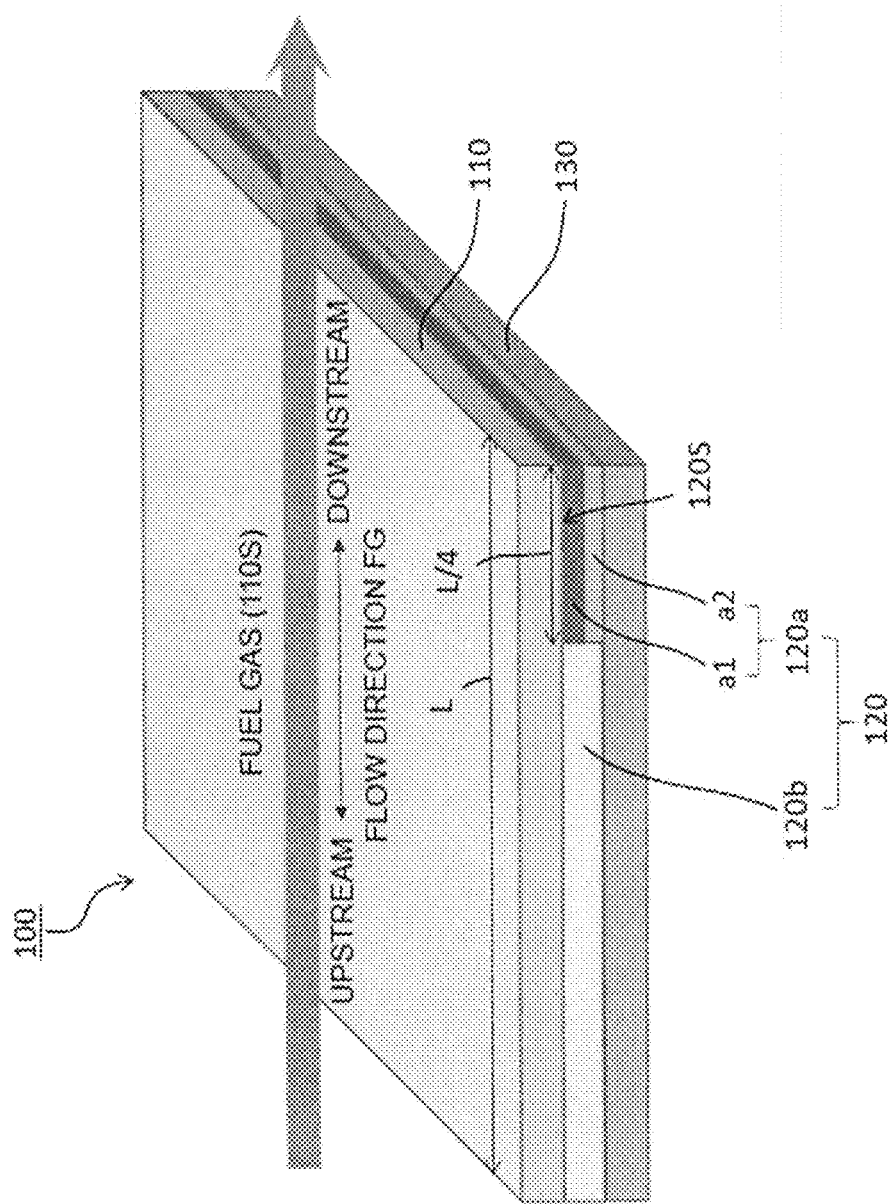
FIG. 4 is a perspective view of a cell.

In this context, as shown in FIG. 4, the downstream part 120a includes a first region a1 and a second region a2.

The first region a1 is a region within 3 μm of the anode side surface 120S of the downstream part 120a. The anode side surface 120S is the interface between the anode 110 and the solid electrolyte layer 120. The anode side surface 120S is a straight line that is approximated using a method of least squares to a line of a rapid change in the element densities included in the solid electrolyte layer 120 when mapping the component densities in a cross section of the cell 100.

The first region a1 contains a zirconia-based material as a main component. The first region a1 includes tetragonal zirconia and cubic zirconia as the zirconia-based material.

The cubic zirconia is a zirconia that is formed from a crystalline phase in which the phase is mainly cubic crystals. The cubic zirconia includes for example 8YSZ or 10YSZ (10 mol % yttria-stabilized zirconia).

The tetragonal zirconia is a zirconia that is formed from a crystalline phase in which the phase is mainly tetragonal crystals. For example, the tetragonal zirconia includes a 2.5YSZ (2.5 mol % yttria-stabilized zirconia) or a yttria-stabilized zirconia that is less than or equal to 3 mol % such as 3YSZ.

The second region a2 is a region that is disposed between the cathode 130 and the first region a1. The second region a2 is the region that is other than the first region a1 in the downstream part 120a of the solid electrolyte layer 120. It is provided on the opposite side of the anode 110 and sandwiches the first region a1. Although there is no particular limitation to the thickness of the second region a2, it may be set to be greater than or equal to 1 μm to less than or equal to 30 μm. The thickness of the second region a2 is preferably less than or equal to 80% of the total thickness of the solid electrolyte layer 120 when taking into account the inhibiting of damage to the solid electrolyte layer 120. The thickness of the second region a2 is preferably greater than or equal to 20% of the total thickness of the solid electrolyte layer 120 when taking into account the inhibiting of a reduction in the oxide ion conductivity of the solid electrolyte layer 120.

The second region a2 contains a zirconia-based material as a main component. The second region a2 includes cubic zirconia as the zirconia-based material. The second region a2 may include tetragonal zirconia.

In the present context, a ratio R1 of the peak intensity of the tetragonal zirconia to the peak intensity of the cubic zirconia in a Raman spectrum of the first region a1 (suitably abbreviated below to "intensity ratio R1 of the first region a1") is greater than a ratio R2 of the peak intensity of the tetragonal zirconia to the peak intensity of the cubic zirconia in a Raman spectrum of the second region a2 (suitably abbreviated below to "intensity ratio R1 of the second region a2").

For that purpose, it is possible to strengthen the framework structure of the porous first region a1 with a configuration of robust connections between the cubic zirconia particles by the use of tetragonal zirconia particles that have a relatively smaller particle diameter when compared to the cubic zirconia particles. Therefore, when the operation of the fuel cell stack 10 is stopped under emergency conditions, it is possible to avoid damage to the solid electrolyte layer 120 even when a stress is applied to the solid electrolyte layer 120 caused by re-oxidizing of the downstream region of the anode by the oxygen that undergoes a reverse flow in the fuel flow passage 1105 from the fuel gas outlet.

Furthermore, the upstream part 120b has a main component of a zirconia-based material. The upstream part 120b includes cubic zirconia as the zirconia-based material. The upstream part 120b may include tetragonal zirconia. The material composition of the upstream part 120b may be the same as the material composition of the second region a2 of the downstream part 120a.

The intensity ratio R1 of the first region a1 is preferably larger than an intensity ratio R3 of the tetragonal zirconia to the cubic zirconia in a Raman spectrum of the upstream part 120b (suitably abbreviated below to "intensity ratio R3 of the upstream part 120b"). In this manner, since it is possible to increase the oxide ion conductivity in the upstream part 120b and the second region a2 of the downstream part 120a to be greater than the oxide ion conductivity in the first region a1 of the downstream part 120a, the overall oxide ion conductivity of the solid electrolyte layer 120 can be maintained.

The intensity ratio R1 of the first region a1 is obtained as described below.

Firstly, in a cross section that is parallel to the thickness direction of the first region a1, a Raman spectrum is acquired at 5 positions that equally divides the first region a1 in a planar direction that is orthogonal to the thickness direction. It is preferred that the locations in the thickness direction of the 5 positions for acquisition of the Raman spectrum are approximately the same position.

Next, the ratio of the spectrum intensity of the tetragonal zirconia to the spectrum intensity of the cubic zirconia is calculated by respectively analyzing the Raman spectrum at the 5 positions by use of the unique Raman spectrums (known spectrum data) respectively for tetragonal zirconia and cubic zirconia. The means for analyzing the known spectrum data for the Raman spectrum by the use of known spectrum is a CLS method that is a known method for inferring a chemical species on the basis of a Raman spectrum.

Next, the intensity ratio R1 for the first region a1 is calculated as the arithmetic average of the intensity ratios that were respectively calculated in relation to the Raman spectrums at 5 positions. The intensity ratio R1 is an index that indicates the concentration ratio (abundance ratio) of the tetragonal zirconia to the cubic zirconia in the first region a1. The unit used in the intensity ratio R1 of the first region a1 is "%."

Although there is no particular limitation on the intensity ratio R1 of the first region a1, it may be configured as greater than or equal to 0.5% and less than or equal to 10%. The intensity ratio R1 of the first region a1 is preferably greater than or equal to 1% and more preferably less than or equal to 8%.

The intensity ratio R2 of the second region a2 is obtained as described below in a similar manner to the intensity ratio R1 of the first region a1.

Firstly, in a cross section that is parallel to the thickness direction of the second region a2, a Raman spectrum is acquired at 5 positions that equally divides the second region a2 in a planar direction. It is preferred that the locations in the thickness direction of the 5 positions for acquisition of the Raman spectrum are approximately the same position.

Next, the ratio of the spectrum intensity of the tetragonal zirconia to the spectrum intensity of the cubic zirconia is calculated by respectively analyzing the Raman spectrum at the 5 positions by use of the unique Raman spectrums (known spectrum data) respectively for tetragonal zirconia and cubic zirconia.

Next, an intensity ratio R2 for the second region a2 is calculated as the arithmetic average of the intensity ratios that were respectively calculated in relation to the Raman spectrums at 5 positions. The intensity ratio R2 is an index that indicates the concentration ratio (abundance ratio) of the tetragonal zirconia to the cubic zirconia in the second region a2. The unit used in the intensity ratio R2 of the second region a2 is "%."

Although there is no particular limitation on the intensity ratio R2 of the second region a2, it may be configured as less than or equal to 0.1% as long as it is smaller than the intensity ratio R1 of the first region a1. The intensity ratio R2 of the second region a2 is preferably less than or equal to 0.05%.

The intensity ratio R3 of the upstream part 120b is obtained as described below in the same manner as the intensity ratio R1 of the first region a1 of the downstream part 120a.

Firstly, in a cross section that is parallel to the thickness direction of the upstream part 120b, a Raman spectrum is acquired at 5 positions that equally divides the upstream part 120b in a planar direction. It is preferred that the locations in the thickness direction of the 5 positions for acquisition of the Raman spectrum are approximately the same position.

Next, the ratio of the spectrum intensity of the tetragonal zirconia to the spectrum intensity of the cubic zirconia is calculated by respectively analyzing the Raman spectrum at the 5 positions by the use of the unique Raman spectrums (known spectrum data) respectively for tetragonal zirconia and cubic zirconia.

Next, the intensity ratio R3 for the upstream part 120b is calculated as the arithmetic average of the intensity ratios that were respectively calculated in relation to the Raman spectrums at 5 positions. The intensity ratio R3 is an index that indicates the concentration ratio (abundance ratio) of tetragonal zirconia to cubic zirconia in the upstream part 120b. The unit used in the intensity ratio R3 of the upstream part 120b is "%."

Although there is no particular limitation on the intensity ratio R3 of the upstream part 120b, it may be configured as less than or equal to 0.1% as long as it is smaller than the intensity ratio R1 of the first region a1 of the downstream part 120b. The intensity ratio R3 of the upstream part 120b is preferably less than or equal to 0.05%.

Method of Manufacturing Fuel Cell Stack 10

The method of manufacturing the fuel cell stack 10 will be described below.

Firstly, a slurry is prepared by mixing an organic binder and a solvent into a mixed powder (for example, a mixed powder of NiO powder and YSZ powder) for forming the anode 110. The slurry is used to prepare an anode sheet (green body for anode 110).

Next, after dip molding the zirconia-based material for the first region a1 onto ¼ of the region in the flow direction FG from the downstream end side in the fuel gas flow direction FG of the green body for the anode 110, a green body for the downstream part 120a of the solid electrolyte layer 120 is formed by dip molding the zirconia-based material for the second region a2 thereon.

At that time, the mixing ratio of the tetragonal zirconia that is included in the zirconia-based material for the first region a1 is higher than the mixing ratio of the tetragonal zirconia that is included in the zirconia-based material for the second region a2. The intensity ratio R1 of the first region a1 can be adjusted with reference to the mixing ratio of the tetragonal zirconia to the cubic zirconia that is included in the zirconia-based material for the first region a1. In the same manner, the intensity ratio R2 of the second region a2 can be adjusted with reference to the mixing ratio of the tetragonal zirconia to the cubic zirconia that is included in the zirconia-based material for the second region a2. However, the zirconia-based material for the second region a2 may be configured only by cubic zirconia.

Next, a green body for the upstream part 120b of the solid electrolyte layer 120 is formed by dip molding the zirconia-based material in a region that exceeds ¼ in the flow direction FG from the downstream end side in the fuel gas flow direction FG of the green body for the anode 110. At that time, the mixing ratio of the tetragonal zirconia that is included in the zirconia-based material for the upstream part 120b is lower than the mixing ratio of the tetragonal zirconia that is included in the zirconia-based material for the first region a1 of the downstream part 120b. The zirconia-based material that is used in the upstream part 120b does not have to contain tetragonal zirconia and may include only cubic zirconia. For example, the upstream part 120b may use the same zirconia-based material as the second region a2 of the downstream part 120a.

Next, after execution of a thermal treatment in a binder removal treatment on the stacked body and the green body for the solid electrolyte layer 120 and the green body for the anode 110, a co-fired body for the solid electrolyte layer 120 and the anode 110 is obtained by co-firing in an atmosphere containing oxygen at 1300 to 1600 degrees C.

Then, a green body for the cathode 130 is formed by dip molding a coating liquid containing a dispersion of a powder for forming the cathode 130 (for example, a $LaFeO_3$ oxide powder) in a solvent onto the surface of the solid electrolyte layer 120.

Next, the cathode 130 is formed by firing the green body for the cathode 130 at 1000 to 1300 degrees C.

Other Embodiments

The present invention is not limited to the above embodiment, and various changes or modifications may be added within a scope that does not depart from the scope of the invention.

In the above embodiment, although the solid electrolyte layer 120 according to the present invention is applied in relation to all the cells 100 that are provided in the fuel cell stack 10, it is sufficient if the solid electrolyte layer 120 according to the present invention is applied to at least one of the cells 100.

In the above embodiment, although the fuel cell stack 10 is provided with a plurality of cells 100 and a plurality of separators 200, it is sufficient if at least one cell 100 and two separators (first separator 200a and second separator 200b) are provided to retain the cell 100.

In the above embodiment, although the cells are formed as square plates, there is no limitation in this regard. For example, the cells 100 may be formed as circular plates, rectangular plates, triangular plates, or a polygonal-shaped plate having 5 or more corners. Even in such a configuration, the downstream part 120a of the solid electrolyte layer 120 is L/4 of the region in the flow direction FG from the downstream end of the solid electrolyte layer 120 in the fuel gas flow direction FG.

In the above embodiment, as shown in FIG. 4, although the fuel gas flow direction FG has been configured as a direction that is parallel to the two sides of the outer edge of the cells 100, there is no limitation in this regard. The fuel gas flow direction FG is not limited with reference to the shape of the cells 100 and may be inclined with reference to the outer edge of the cell 100. Even in such a configuration, the downstream part 120a of the solid electrolyte layer 120 is L/4 of the region in the flow direction FG from the downstream end of the solid electrolyte layer 120 in the fuel gas flow direction FG.

In the present embodiment, although the cells 100 are configured with the anode 110, the solid electrolyte layer 120 and the cathode 130, there is no requirement for a direct connection between the anode 110 and the solid electrolyte layer 120, or for a direct connection between the solid electrolyte layer 120 and the cathode 130. For example, a barrier layer for inhibiting the formation of a high resistivity layer may be interposed between the solid electrolyte layer 120 and the cathode 130. The barrier layer, for example, may be configured by the use of a ceria-based material that contains ceria and a rare earth metal oxide in a solid solution in the ceria. The ceria-based material includes use of GDC, SDC (samarium doped ceria), or the like.

In the present embodiment, although a configuration has been described in which the solid electrolyte layer according to the present invention is applied to a solid oxide fuel cell, the solid electrolyte layer according to the present invention may be applied to applied to a solid oxide-type electrochemical cell such as a solid oxide-type electrolysis cell in addition to a solid oxide fuel cell.

What is claimed is:

1. An electrochemical cell stack comprising:
a first separator;
a second separator; and
an electrochemical cell disposed between the first separator and the second separator,
the electrochemical cell including an anode, a cathode and a solid electrolyte layer, the solid electrolyte layer being disposed between the anode and the cathode and containing zirconia-based material as a main component, the zirconia-based material including a tetragonal zirconia and a cubic zirconia,
the solid electrolyte layer having a downstream part and an upstream part, the downstream part having a length that is no more than one quarter of the total length of the solid electrolyte layer in a flow direction of a fuel gas which flows in a fuel flow passage between the anode and the first separator and having a thickness that is equal to a total thickness of the solid electrolyte layer, the upstream part having a length that is at least three quarters of the total length of the solid electrolyte layer in the flow direction and having a thickness that is equal to the total thickness of the solid electrolyte layer, and
the downstream part including a first region within 3 μm from an anode side surface and a second region disposed between the first region and the cathode having a thickness that is greater than or equal to 20% of the total thickness of the solid electrolyte layer and less than or equal to 80% of the total thickness of the solid electrolyte layer, wherein
the intensity ratio of the tetragonal zirconia to the cubic zirconia in a Raman spectrum of the first region is greater than the intensity ratio of the tetragonal zirconia to the cubic zirconia in a Raman spectrum of the second region, and
the intensity ratio of the tetragonal zirconia to the cubic zirconia in a Raman spectrum of the first region is greater than the intensity ratio of the tetragonal zirconia to the cubic zirconia in a Raman spectrum of the upstream part.

2. The electrochemical cell stack according to claim 1, wherein the intensity ratio of tetragonal zirconia to cubic zirconia in a Raman spectrum of the first region is greater than or equal to 1%.

3. The electrochemical cell stack according to claim 1, wherein the intensity ratio of tetragonal zirconia to cubic zirconia in a Raman spectrum of the second region is less than or equal to 0.1%.

\* \* \* \* \*